(12) United States Patent
Davies et al.

(10) Patent No.: US 7,514,135 B2
(45) Date of Patent: *Apr. 7, 2009

(54) PULTRUDED PART REINFORCED BY LONGITUDINAL AND TRANSVERSE FIBERS AND A METHOD OF MANUFACTURING THEREOF

(75) Inventors: Laurence W. Davies, Winnipeg (CA); Mark Robert Bamford, Puyallup, WA (US); Rodney Herbert Isfeld, Gimli (CA)

(73) Assignee: Omniglass Ltd., Winnipeg, Manitoba (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/766,325

(22) Filed: Jan. 29, 2004

(65) Prior Publication Data

US 2005/0008804 A1 Jan. 13, 2005

Related U.S. Application Data

(60) Division of application No. 10/167,985, filed on Jun. 13, 2002, now Pat. No. 6,746,747, which is a continuation-in-part of application No. 10/024,337, filed on Dec. 21, 2001, now abandoned.

(60) Provisional application No. 60/325,785, filed on Jun. 14, 2001.

(51) Int. Cl.
*B32B 5/12* (2006.01)
*B32B 27/04* (2006.01)

(52) U.S. Cl. ............... 428/113; 428/293.7; 428/294.1; 428/297.4; 428/298.1; 428/299.4; 428/300.7; 428/301.4; 442/6; 442/19; 442/43; 442/239; 442/251

(58) Field of Classification Search ............ 442/6, 442/19, 43, 239, 251; 428/113, 293.7, 294.1, 428/297.4, 298.1, 299.4, 300.7, 301.4
See application file for complete search history.

(56) References Cited

U.S. PATENT DOCUMENTS

| 4,752,513 A | 6/1988 | Rau et al. |
| 4,983,453 A | 1/1991 | Beall |

(Continued)

FOREIGN PATENT DOCUMENTS

EP 0 308 237 3/1989

(Continued)

*Primary Examiner*—Ula C Ruddock
(74) *Attorney, Agent, or Firm*—Adrian D. Battison; Ade & Company Inc.

(57) ABSTRACT

A method for forming a pultruded part includes collating reinforcing fibers by providing a first layer of reinforcing rovings extending in the longitudinal pultrusion direction, applying onto the first layer an intermediate layer of reinforcing fibers at least some of which include at least portions thereof which extend in the transverse direction and covering the intermediate layer with a second layer of rovings extending in the longitudinal direction. Alternatively the transverse fiber layer is formed on the inside surface of a hollow part. To the collated fibers is applied a urethane resin so as to permeate through the layers and the materials are passed through a die to form a thermo-set cross-linked poly-urethane. The transverse layer or layers are relatively thin having a weight less than or equal to 0.5 ounces per square foot and more preferably as low as 0.25 ounces or 0.1 ounces.

15 Claims, 8 Drawing Sheets

U.S. PATENT DOCUMENTS

| | | |
|---|---|---|
| 5,079,054 A | 1/1992 | Davies |
| 5,122,417 A | 6/1992 | Murakami et al. |
| 5,324,377 A | 6/1994 | Davies |
| 5,851,468 A * | 12/1998 | Kaiser ................. 264/177.13 |
| 5,935,498 A | 8/1999 | Vockel, Jr. et al. |
| 6,746,747 B2 * | 6/2004 | Davies et al. ............... 428/113 |
| 6,872,273 B2 * | 3/2005 | Davies et al. ............... 156/148 |
| 6,881,288 B2 * | 4/2005 | Davies et al. ............... 156/148 |

FOREIGN PATENT DOCUMENTS

| | | |
|---|---|---|
| GB | 1466987 | 3/1977 |
| WO | WO 00/78529 | 12/2000 |

* cited by examiner ically increases the cost of the part in that the mat is relatively
PULTRUDED PART REINFORCED BY LONGITUDINAL AND TRANSVERSE FIBERS AND A METHOD OF MANUFACTURING THEREOF This application claims priority under 37 U.S.C. 119 from Provisional Application Ser. No. 60/325,785 filed Jun. 14, 2001.

This application is a continuation-in-part of application Ser. No. 10/024,337 filed Dec. 21, 2001 now abandoned and is a divisional application of application Ser. No. 10/167,985 filed Jun. 13, 2002 and now issued as U.S. Pat. No. 6,746,747.

This invention relates to a pultruded part reinforced by longitudinal and transverse fibers and a method of manufacturing the part.

BACKGROUND OF THE INVENTION

Pultrusion is a technique in which longitudinally continuous fibrous structures are used to pull a resin through a die so that the resin sets and produces a rigid part downstream of the die to which the pulling force is applied.

Originally the longitudinal fibres consisted of simply longitudinal in the extending rovings and the parts were of a relatively simple cross section such as rods, T-bars and the like. However developments have been introduced to reduce the wall thickness of the parts so that complex cross sections including hollow cross sections could be manufactured. In order to achieve the necessary strength of the parts, it was necessary to introduce transverse fibers to provide strength in the transverse direction. Such transverse fibers are conventionally applied using a mat of a woven or non woven material. In many cases the fibers in the mat are generally random so that the number of fibers extending in the transverse direction is relatively small. One major problem with the mat is that it is relatively expensive and can be very expensive so that it is more than double per pound of the cost of the simple conventional rovings. One direction of development has been to provide improved mats which apply more of the fibers in the transverse direction thus allowing the mat to be of reduced thickness to provide the required strength or toughness in the finished part. An example of a mat tailored for pultrusion is shown in published International application PCT/WO78529A1 published Dec. 28, 2000 and assigned to Pella.

An alternative approach to the expense of the mat is to attempt to attach to the longitudinal rovings some transverse fibers which are simply chopped roving material. One example of an arrangement of this type is shown in U.S. Pat. No. 5,324,377 of the present inventor Davies. This method of pultrusion attempted to attach transverse fibers to the outside of a body of longitudinal rovings so as to be carried through the die with the rovings. This method has to date not achieved commercial success.

In order to minimize material costs, commercial pultrusion is normally carried out using polyester as the resin which is a simple thermo-set resin material so that it can be applied to the fibers from a bath and is thermo-set within the heated die. However polyester is a linear polymer which is thus not cross-linked so that it is relatively brittle so that it tends to crack when bending forces are applied to the part. This cracking is reduced by providing in the reinforcing fibers a mat material at the surface of the wall of the part so that the fibers are held in place by the transverse fibers, This avoids or reduces the tendency of the longitudinal fibers to break through the surface of the part on bending of the part. Until now, therefore, polyester resin parts have required that the mat be applied on the outside surface. Thus in a hollow cross section, a mat is applied on the surface of each wall of the part so that there is a mat on the outside and also a mat on the inside surface with the normal longitudinal fibers or rovings being placed in between the two mats. This construction significantly increases the cost of the part in that the mat is relatively expensive and two mats are required. Also the provision of two mats increases the thickness of the part and thus again increases material costs.

Non-linear resins, which may be cross-linked or amorphous such as epoxy resins, have been available for some years and are used in pultrusion; but these are significantly more expensive than polyester and thus have not achieved significant market penetration in conventional simple parts for which pultrusion is ideally suited.

Recently, improved non-linear resin materials, particularly those based on urethane, have become available which are still more expensive than polyester but are not as expensive as other cross-linked resins such as epoxy. These cross-linked urethane resins could simply be used in replacement for the conventional polyester which might lead to increased strength where required or desirable. However and in most cases the resins are of increased cost so it is necessary to consider the possibility of otherwise reducing material costs to maintain a competitive economic product while at least matching the strength of the competitive polyester product.

Mats for reinforcing pultruded parts are provided to add structural strength and in order to provide the required or expected amount of strength have a weight of fibers greater than 0.5 ounces per square foot and generally 0.75 to 1.0 ounces per square foot Veils, which are used to provide surface characteristics and not to provide any structural strength are lighter, generally less than 0.5 ounces per square foot and typically of the order of 0.1 ounces per square foot. Conventional veils are used outside rovings or outside mats at the surface to provide an improved surface appearance or to retain the stiffer glass fibers within the resin to prevent fiber "bloom" or projecting fibers which can act as slivers. This latter requirement to prevent slivers is particularly important in tool handles or similar products. The retention of fibers to prevent weathering or bloom is particularly important in fenestration or similar products. Veils are well known and well used, when required for the part concerned, by persons skilled in this art and are not intended to form part of and are not considered as part of the fiber reinforcement.

SUMMARY OF THE INVENTION

It is one object of the present invention, therefore, to provide an improved pultruded part.

According to a first aspect of the invention, therefore, there is provided a pultruded part comprising:

a wall having a first surface and a second surface spaced by a thickness of the part, the wall extending longitudinally in a pultrusion direction and having a transverse width transverse to the longitudinal pultrusion direction;

fiber layers within the wall;

a thermo-set, cross-linked poly-urethane permeated through the fiber layers;

the fiber layers including at least one first layer of fibers having fibers extending only in the longitudinal pultrusion direction;

the fiber layers including one or more second layers;

the or each second layer consisting solely of a layer of fibers such that the poly-urethane is permeated through the layer of fibers between the fibers;

the or each second layer having fibers with at least portions thereof extending transverse to the longitudinal direction;

the or each second layer of fibers having a total quantity of fibers in the or each second layer which is of the order of or less than 0.5 ounces per square foot.

Preferably at least one part of the wall is reinforced through its thickness solely by fibers extending only in the longitudinal pultrusion direction.

Preferably the or each second layer of fibers comprises an entangled layer of staple fibers.

Preferably the or each second layer of fibers is a scrim or mesh having openings for penetration of the poly-urethane between the fibers.

Preferably the wall includes a leg portion thereof connected to a main body portion of the wall only at one end of the leg so as to define a second free end of the leg and wherein reinforcing fibers in the leg consist solely of fibers extending only in the longitudinal pultrusion direction.

Preferably the leg portion has a wall that is thicker than that of the main body portion.

Preferably the or each second layer includes fibers which are formed of metal strands which provide both transverse strength and the characteristic of electrical conductivity and/or ferromagnetism.

Preferably the or each second layer of fibers has a total quantity of fibers in the layer which is of the order of or less than 0.25 ounces per square foot.

Preferably the or each second layer of fibers each has a total quantity of fibers therein which is of the order of 0.1 ounces per square foot.

Preferably the wall defines a peripheral wall fully surrounding a hollow interior such that the first surface faces outwardly and the second surface faces inwardly and wherein the reinforcing fibers consist only of:

a first layer formed wholly of longitudinal fibers where the fibers of the first layer extend only in the longitudinal pultrusion direction; and a second layer formed wholly of fibers such that the poly-urethane is permeated through the layer of fibers between the fibers of the second layer;

wherein the second layer has fibers with at least portions thereof extending transverse to the longitudinal direction;

wherein the first and second layers are in contact at a location between the first and second surfaces;

wherein the first layer is located at the first surface such that some of the longitudinal fibers thereof are located at the first surface;

and wherein the second layer is located at the second surface such that some transverse fiber portions are located at the first surface and such that the first layer is spaced from the second surface over the whole of the second surface by the second layer.

The longitudinal fibers referred to herein are usually glass rovings as these are inexpensive and widely available in a range of yields. However the present invention is not limited to rovings and other longitudinal bulk fibers may be used or may become available.

The reference to fibers extending both in the longitudinal pultrusion direction and transverse to the longitudinal direction is intended to include any type of mat or veil structure where the fibers are not wholly longitudinal. This includes staple fibers and continuous fibers. This includes fibers which are woven so as to extend directly longitudinal and directly transverse. This includes random non-woven mats where the fibers extend in random directions so that only portions of the fibers are transverse. This includes entangled batting. Other types of mat structure can also be included provided there is some transverse component of the fibers and provided the structure satisfies the other features as defined herein.

Where the reinforcing fibers are stated to be at or substantially at the surface, this is intended to include situations where the conventional surface veil of surface fibers is included or is not included. In some cases the surface veil is used to provide surface characteristics as is well known and the definition referred to herein assumes that this can be selected for use or not without significantly affecting the fiber reinforcement effects provided by the main body of the reinforcing fibers.

In one preferred arrangement, the wall defines a peripheral wall fully surrounding a hollow interior such that the first surface faces outwardly of the hollow interior and the second surface faces inwardly toward the hollow interior, the at least one first layer of fibers consists solely of a first layer of reinforcing fibers located substantially at the first surface and said one or more second layer of fibers are reinforcing fibers and consists solely of a second layer of reinforcing fibers located at the second surface.

In another preferred arrangement, the at least one first layer of fibers includes one first layer of reinforcing fibers located substantially at the first surface and another first layer of reinforcing fibers located substantially at the second surface and said one or more second layer of fibers comprises a layer of reinforcing fibers which is located intermediate said one first layer and said another first layer.

In one arrangement, the fibers of the intermediate layer form fibers of a pre-formed mat which may be of a conventional construction defined by random continuous fibers bonded or needle punched for connection. The mat may also be of the construction shown in the above published International Application assigned to Pella Corporation and on which one of the present inventors Davies is one of the named inventors.

In another arrangement, the intermediate layer of fibers comprises a plurality of cut fibers which are unsupported by mat fibers and are applied onto the second layer of fibers to be carried thereby. In this arrangement, the intermediate layer of fibers preferably consist wholly cut fibers.

For this same reason, the transverse layer may be a scrim or mesh having openings for penetration of the resin between the fibers so as to allow effective cross-linking of the resin. It has also been found that surprisingly a veil of staple polyester fibers having a weight of as low as 0.1 oz/square foot can provide the required additional strength and/or toughness to the product.

The transverse or intermediate layer may be formed of any suitable fibers including but not limited to glass fibers, carbon fibers polymer fibers such as polyester or aramids, metal strands such as aluminum or steel or natural fibers such as cotton, jute, hemp or flax.

Natural fibers such as flax have the advantage that they are inexpensive and are to some extent porous thus allowing the resin to enter the interstices in the fibers and providing an increased bond between the fibers and the resin which can lead to reduced de-lamination and thus increased strength.

Metal strands have the advantage that they provide the required additional strength and/or toughness in the intermediate layer, but also they can provide other functions such as the required ferromagnetic effect for magnetic coupling as shown for example in U.S. Pat. No. 5,129,184 (Fish) issued Jul. 14, 1992 and/or an electrostatic charging effect for electrostatic deposition of a coating or paint material.

In view of this increased strength in the resin, the wall may include a leg portion thereof in which the reinforcing fibers consist solely of the longitudinal fibers, that is there is no transverse fibers. This is effected where the leg such as a glazing leg of a window profile has a length greater than 0.5 inches which would normally require transverse reinforcement but a length less than about 1.0 inches where there is insufficient bending moment in the leg itself to allow cracking in the leg to occur. It will be appreciated that in a non-homogeneous material such as the pultrusions defined above the bending effect at an angle is different from that within a span of the material. Thus the provision of transverse fibers within a leg or span of greater than 1.0 inches in length is required while such fibers are not necessary at an angle between two legs of shorter length.

The leg portion may have a wall that is thicker than that of the main body portion; but this is provided for balancing of forces in the pultrusion process rather than in order to provide increased strength to compensate for the absence of the mat or transverse fibers.

In one example such as for fenestration products, the main body portion defines a hollow section and the leg portion, generally a glazing leg, extends from one end at the hollow section to an opposed free end.

The poly-urethane described hereinafter has the advantage that it is more resistant to degradation by UV and weather so that it is more suitable for fenestration products.

The construction described in the embodiments hereinafter also may have the advantage that it allows a reduced wall thickness. The use, in lower strength products such as fenestration products, conventionally of two outside perimeter mats can be reduced by one mat from two mats to one mat so that the total thickness can be reduced by at least 0.015 inch, which is the typical thickness of one mat. In addition the increased strength in the resin itself may allow a further reduction so that typically a conventional range in inches of polyester resin construction of 0.070 to 0.180 for different end uses can be reduced to a range of 0.030 to 0.120. A thickness even as low as 0.025 may also be possible for products such as fenestration products which require lower structural strength and a thickness of the order of 0.080 may be possible for products such as ladder rails or tool handles which require higher structural strength. In particular the higher strength structural products often include a third mat along the center and thus the three mats of the conventional product can be reduced to one mat or veil in the arrangement described above thus yet further reducing the thickness. This reduction in mat content also increases the proportion of longitudinal fibers or rovings and this also has the advantage that the longitudinal stiffness of the part as provided by the longitudinal fibers is also increased. Thus a ladder rail may be reduced typically in thickness from 0.125 to 0.105 inch with an increase in strength.

In one advantageous arrangement, the transverse fibers are formed of metal strands which provide both transverse strength and the characteristic of electrical conductivity and/or ferromagnetism for the part.

BRIEF DESCRIPTION OF THE DRAWINGS

Embodiments of the invention will now be described in conjunction with the accompanying drawings, in which.

In the drawings like characters of reference indicate corresponding parts in the different figures.

BRIEF DESCRIPTION OF THE TABLES

Figure 8:
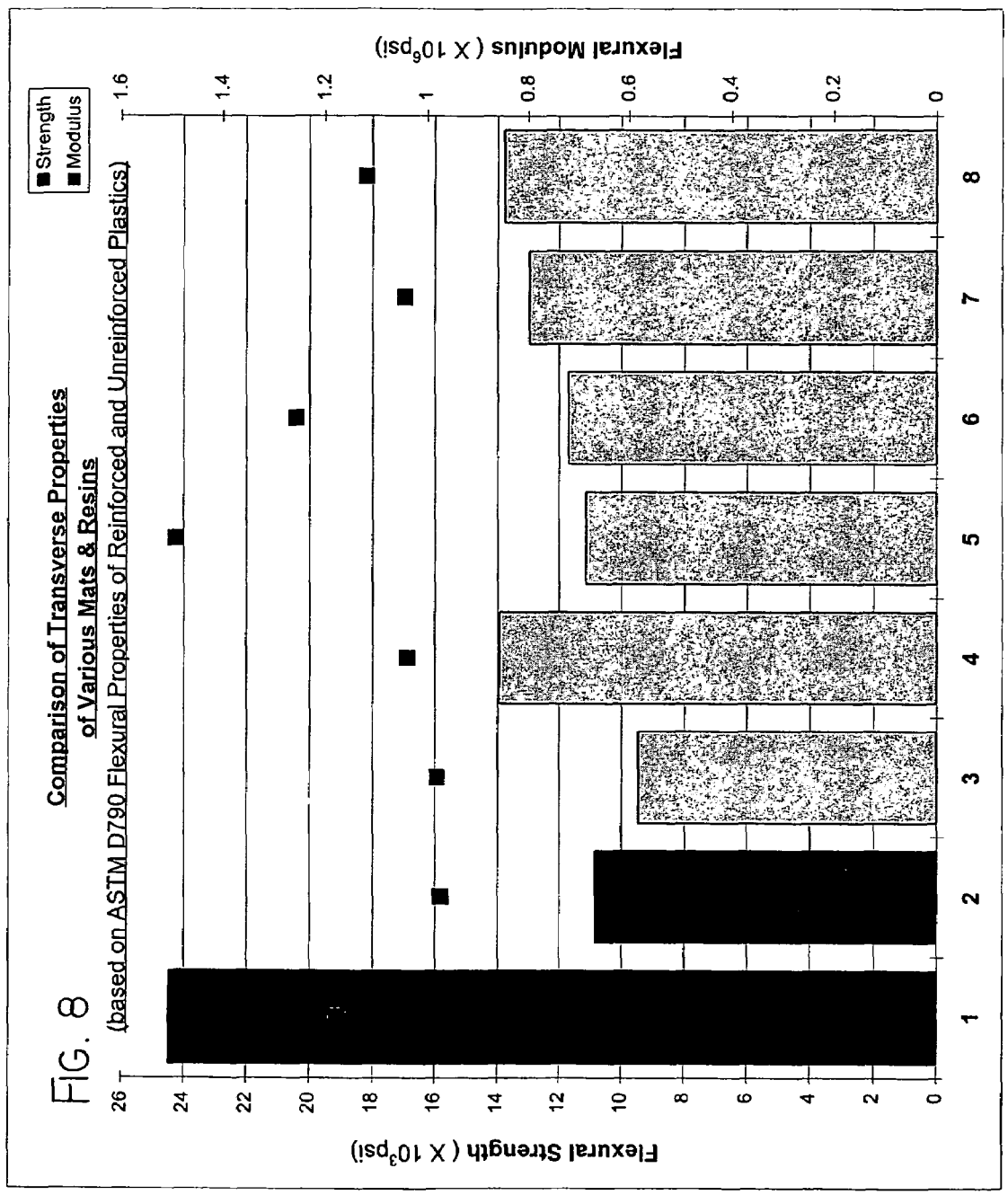
FIG. 8 is a first graph showing the comparative strength and modulus of a series of coupon samples as set out in table 1 based upon standard test ASTM D790.
Figure 9:
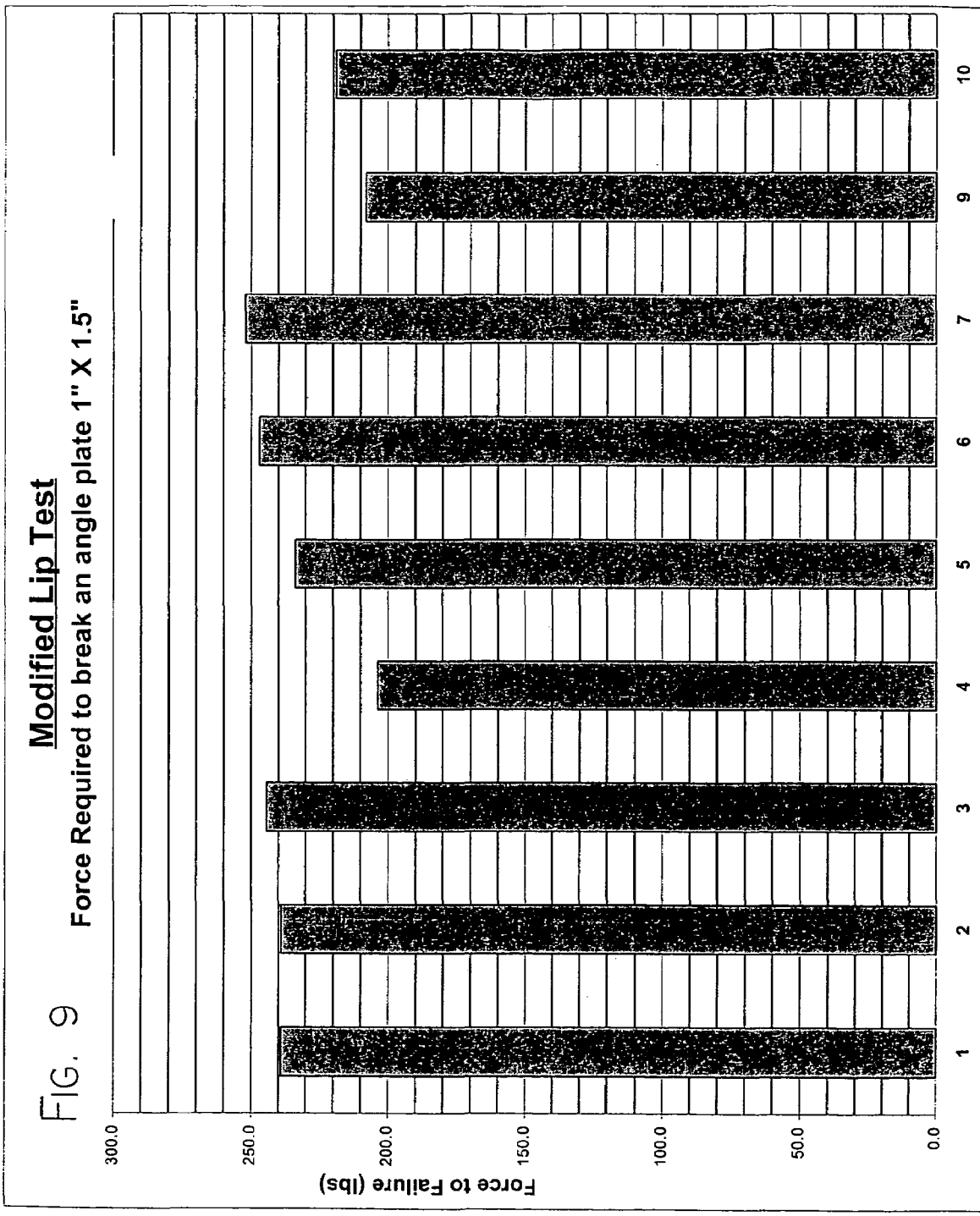
FIG. 9 is a second graph showing the comparative strength of a series of angle samples as set out in table 1 with the test being entitled modified Lip Test.

Table 1 is a list of the materials tested in FIGS. 8 and 9.

DETAILED DESCRIPTION

Figure 1:
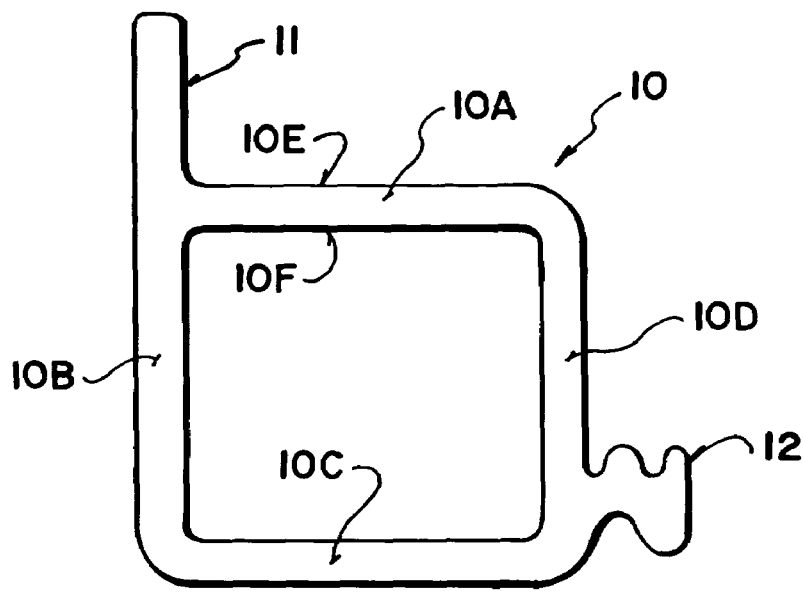
FIG. 1 is a cross sectional view of typical pultruded part according to the present invention.

In FIG. 1 is shown a typical cross section of a pultruded part which includes a hollow section 10, a leg 11 and a projecting portion 12. The hollow section 10 includes four walls 10A, 10B, 10C and 10D each of which has a thickness between an outer surface 10E and an inner surface 10F. Thus each wall part of the pultrusion must be manufactured in a manner which provides the necessary strength to prevent cracking of the part.

Figure 2:
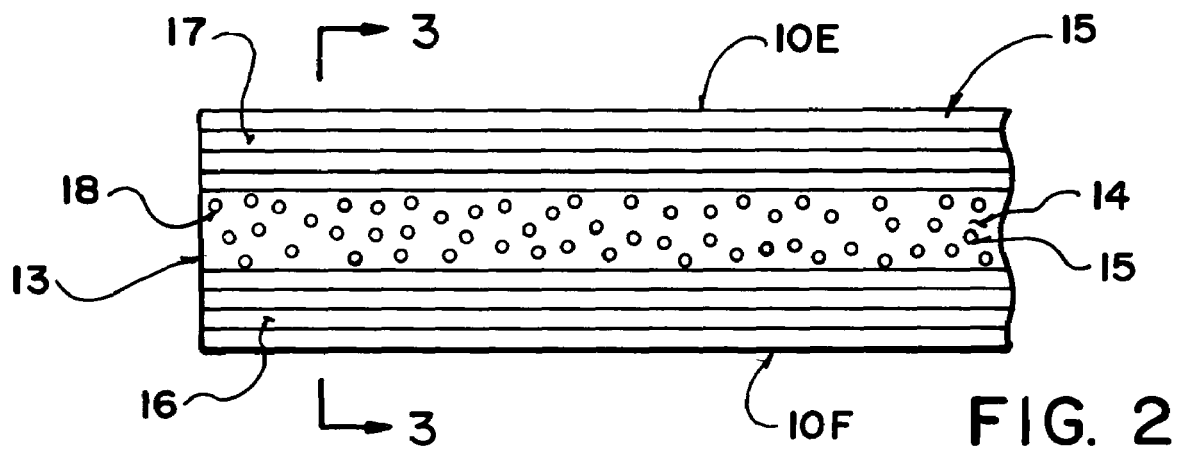
FIG. 2 is a cross sectional view on an enlarged scale of one wall of the part of FIG. 1, the cross section being at right angles to that of FIG. 1.
Figure 3:
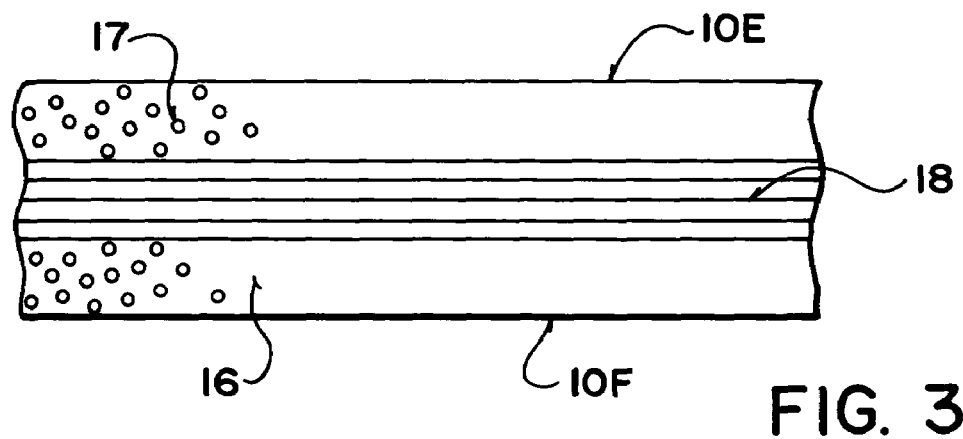
FIG. 3 is a cross sectional view on an enlarged scale of one wall of the part of FIG. 1.

In FIGS. 2 and 3 is shown a cross section of one wall of the part which is cut to form an end face 13. These cross sections show that the wall of the part is formed from a resin 14 which is shaped to define the surfaces 10E and 10F and a volume of the part is defined by a resin material 15 which is interspersed between or permeated through fiber reinforcement 15 within the part. In the arrangement as shown, the fiber reinforcement includes a first layer 16 of longitudinally extending fibers, primarily rovings, a second layer 17 also of longitudinally extending rovings and an intermediate layer 18 of fibers arranged to provide transverse strength.

The resin which extends through the part so that it defines the two surfaces of the part is a urethane resin available from Resin Systems Inc. of Edmonton, Alberta and is defined by a two-part resin which includes a catalyst for activating the resin. The particularly preferred resin is known as Version G available from the above company which has the following characteristics:

1. The resin provides an ideal VOC free high performance two-component polyurethane system for use in composite manufacturing. The resin exhibits physical properties that meet or exceed those of existing products—whether commodity polyesters, or specialty resins.

2. The resin system is a general purpose thermosetting resin designed specifically for the composites pultrusion process. The resin is based on urethane chemistry, has been shown to provide excellent composite properties, including superior toughness, shear strength and resistance to cracking.

3. The resin system is formulated to be a direct replacement for existing polyester or epoxy resins. In most cases, the existing pultrusion dies, heaters and control systems can be used with relevant minor modification for optimisation of processing. The resin shows excellent physical properties when used with glass fiber sizing of the "polyester and vinyl ester" type.

4. The resin is a two-component resin that must be used with a resin injection system. The resin components may be mixed in a suitable ratio, for example 1:1, by a standard static mixer placed prior to the injection port. For dies not currently equipped for injection, a simple injection chamber, made from for example UHMW PE, material may be added to the entrance end of the die. The resin system has been shown to work with both high pressure and low pressure injection systems.

5. The resin may be used directly as a "neat" system, or it may be provided with fillers for cost reduction or property enhancement. The resin may work with a recycled rubber crumb filler system, which combines synergistically with the urethanes to enhance toughness and crack resistance properties or may use a more conventional calcium carbonate filler material.

Key Benefits:
  Zero VOCs
  Excellent impact resistance.
  Thick section curing stability.
  Lower operating temperatures.
  Faster pulling speeds from higher reactivity.
  Suitable for a wide variety of closed mold processes.
  Secondary "processability"—Composites readily accept construction fasteners, or can be "punched" without any crazing or cracking.

Figure 4:
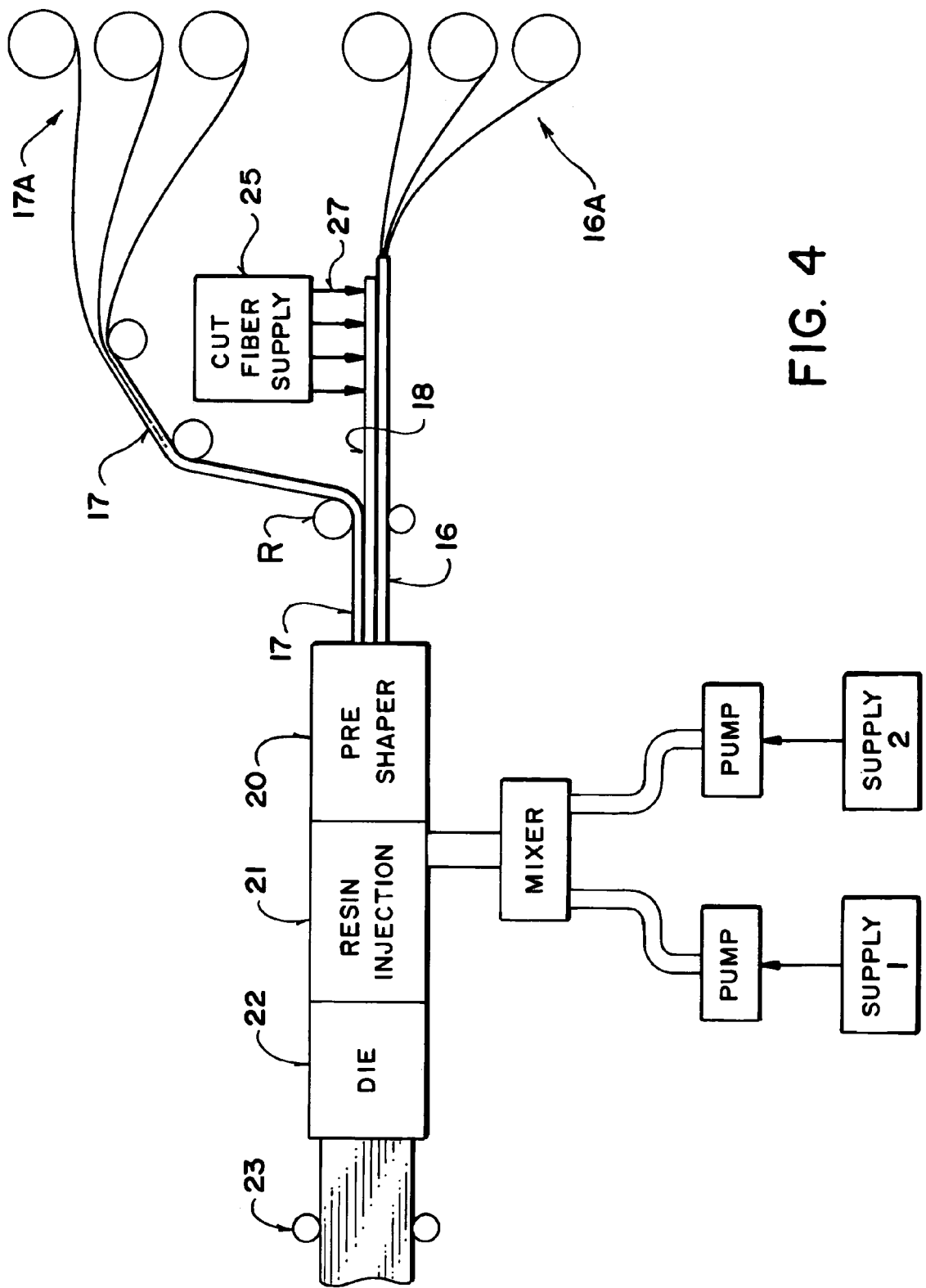
FIG. 4 is a schematic side elevational view of a method according to the present invention for manufacturing the part of FIG. 1.
Figure 5:
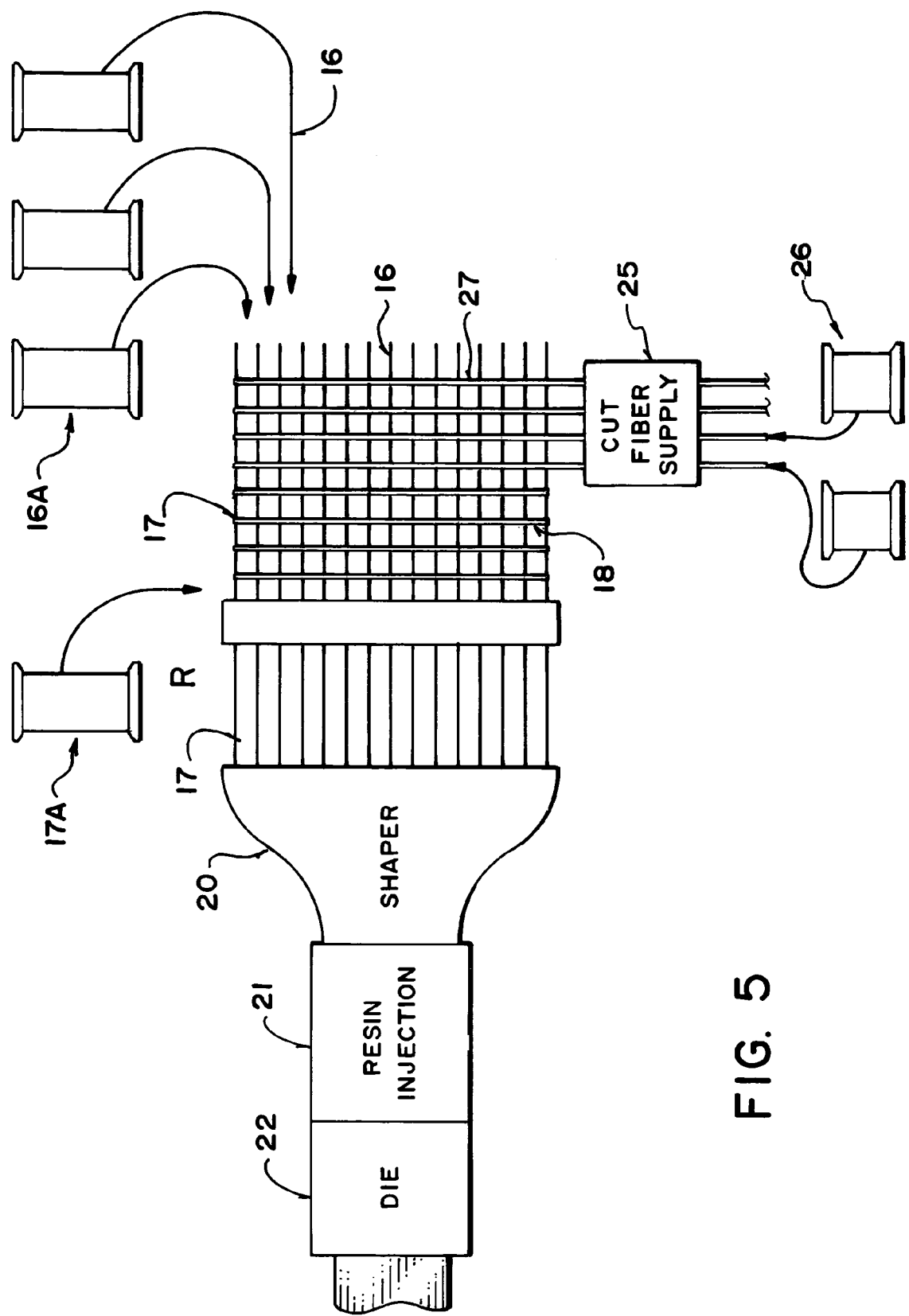
FIG. 5 is a top plan view of the method of FIG. 4.
Figure 6:
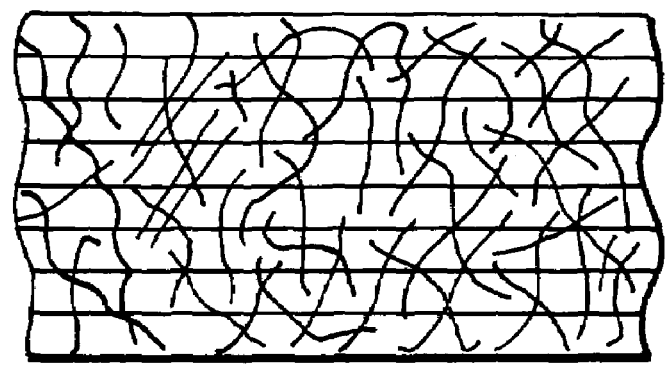
FIG. 6 is a top plan view of an alternative arrangement of the intermediate layer of the method of FIG. 4.

In FIGS. 4 and 5 is shown schematically a method for using the resin for application to the reinforcing fibers to form the part of FIG. 1.

Thus the longitudinal fibers 16 are supplied from roving bobbins 16A to define a layer of the rovings arranged substantially side by side which are carried forwardly through the pre-shaper 20 and the resin injection system 21 into the die 22 by a pulling system schematically indicated at 23 downstream of the die. As the layer 16 forms a band, it can act as a conveyor carrying fibers forming the intermediate layer 18 into the same elements for forming the pultruded part. The intermediate layer 18 is covered by the upper layer 17 again formed from rovings supplied from roving bobbins 17A thus the intermediate fibers are protected and encapsulated as they are carried into the pultrusion system between the two layers 16 and 17. The pre-shaper 20 can therefore be of a simple construction which causes the band defined by the three layers to be shaped into the required shape to enter into the die to form the construction shown in cross section in FIG. 1. The construction of the pre-shaper will be well known to one skilled in the art and therefore does not require detailed explanation here.

The resin injection arrangement is designed for use with the two-part resin material described above and therefore there are two supplies supply 1 and supply 2 which are pumped from a container via two separate pumps into a mixer immediately upstream of the resin injection system. The materials are therefore mixed for only a short period of time before the resin is injected into the dry fibers so as to permeate through the fibers and to be carried by the fibers into the die. The details of the mixer valve and the resin injection system are again well known to one skilled in the art and provide the necessary controls for varying the mix proportions and for ensuring that the required amount of resin is maintained within the injection system.

In view of the fact that the transverse fiber layer 18 is protected within the two layers 16 and 17, it is possible to supply the transverse fiber layer either as a pre-formed mat or as individual chopped fibers. Pre-formed mat is relatively expensive since it involves an additional process and this may double or triple the base material costs. In FIG. 5 therefore is shown a cut fiber supply device 25 which receives fibers from yarn or roving supplies 26 and chops those fibers into fiber strands 27 laid across the width of the layer 16 defined by the rovings 16A. These fibers can thus be laid loosely across the layer 16 since they will be covered by the layer 17 supplied from the rovings 17A at a guide roller R. In a yet further arrangement, the fibers of the intermediate layer can be added by mixing cut fibers with the resin material and injecting the resin between the roving layers so that the resin permeates through the roving layers while leaving the cut fibers between the rovings. Such cut fibers can be introduced to the resin during the mixing stage and can pass through the pump with the resin into the die block as described herein.

As the rovings carry the cut fibers, or other fibers of the intermediate layer however they are introduced, there is no problem of the intermediate layer skewing as it enters the die and no requirement therefore for anti-skewing arrangements within the intermediate layer. It will be appreciated that the application of cut fibers has significantly less structural stability than even the thin mats and veils described herein and yet even these cut fibers can be introduced without skewing or other breakdown of the layer becoming a problem.

The intention is therefore to provide fibers which extend with their direction primarily or wholly across the width of the layer 16 so as to avoid the necessity for additional fiber elements within the layer 18 which do not contribute to the transfer strength. The supply element 25 therefore forms in effect a gun which fires the fibers onto the layer 16 but without sufficient force to disturb the layer 16. Conventional chopping guns can be used for this purpose or a gun can be designed which fires the fibers across the width of the layer 16 so that they are cut only when they reach across the full width thus laying them across the full width as shown in FIG. 5.

In an alternative arrangement, the intermediate layer is formed simply from a mat pre-formed using conventional materials.

The fibers of the intermediate layer can be formed from glass using relatively thick or coarse fibers for strength or can be fine glass fibers of the type normally formed to provide a veil. The fiber layer normally has a weight less than 1.0 ounce per square foot. Other such mats may have a weight of the order of 0.5 ounces per square foot. The lightweight veil material formed of fine glass fibers generally has a weight of the order of 0.25 ounces per square foot.

An alternative material which can be used is a polyester veil material which is formed by staple fibers of fine polyester in a mat which can be heat bonded using high and low melt fibers in the polyester mat. Such a mat may have a weight less than 0.25 ounces per square foot and preferably of the order of which is equal to 0.1 ounces per square foot (30 grams per square meter). It is well known in the field of pultrusion that structural mats, that is a mat which contributes to the structural strength of the part have a weight greater than 0.5 ounces per square foot and generally much heavier such as 0.75 to 1.0 ounces per square foot. Veils which are lighter than 0.5 ounces per square foot are known but are not used for structural strength, instead being used as a conventional veil which is used to provide required surface characteristics.

In FIG. 8 is shown a graph of the results from a first series of different trials of materials 1 to 8 shown in table 1. The results are based upon a standard ASTM coupon test identified as ASTM D790:

In FIG. 9 is shown a table of results from a second series of different trials of the same materials from table 1. The results are based upon test of right angle pieces formed from the materials set out in Table 1 where the strength to break was determined by bending the angle piece in a direction to increase the angle from the nominal 90 degrees to breaking of the part. It will be noted that materials 9 and 10 in Table 1 were not used in the tests of FIG. 8.

Figure 10:
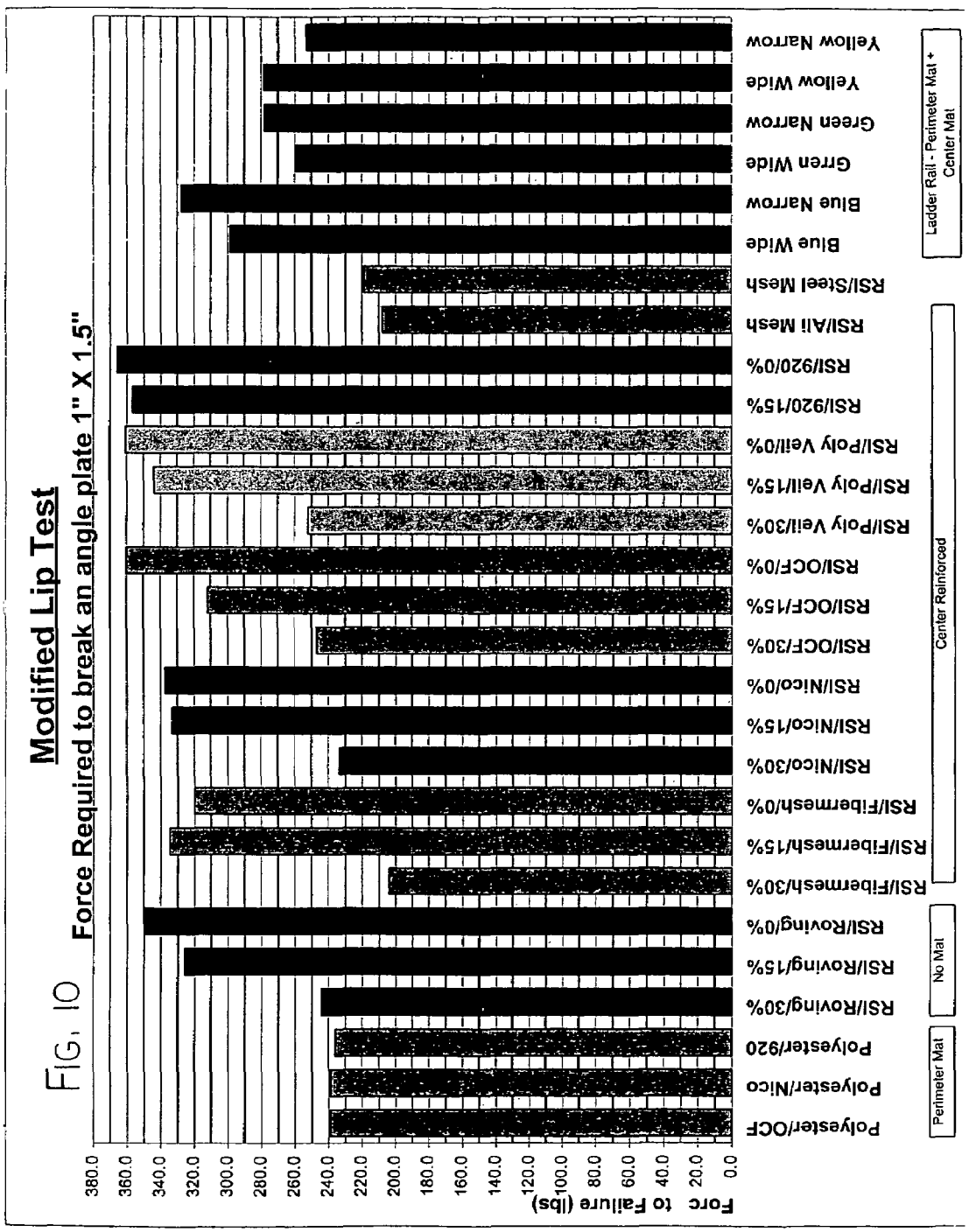
FIG. 10 is a second graph showing the comparative strength of a series of angle samples as set out in table 2 with the test being entitled modified Lip Test 2.

In FIG. 10 is shown a table of results from a series of trials of the materials from identified at the bottom of the figure. The results are based upon test of right angle pieces where the strength to break was determined by bending the angle piece in a direction to increase the angle from the nominal 90 degrees to breaking of the part. For explanation of the figure it will be noted that the items marked "polyester" are of a conventional nature using the conventional resin. Those marked "RSI" use the resin of the present invention. Where a percentage is given, this relates to the percentage of filler material. "920" "Nico" and "OCF" all relate to particularly types of mat as explained hereinbefore. The terms "blue", "green" and "yellow" relate to conventional ladder rail material known by those in the art to relate to particular grades of the material for required strengths. It is these conventional strengths which the present invention is attempting to match and it will be noted that these are exceeded for example by the samples "RSI/poly veil/15%" and "RSI/poly veil/0%" which are particularly preferred in this invention. Such examples can exceed the strength requirement while manufacturing at reduced cost with a thinner part and of increased longitudinal stiffness.

Figure 7:
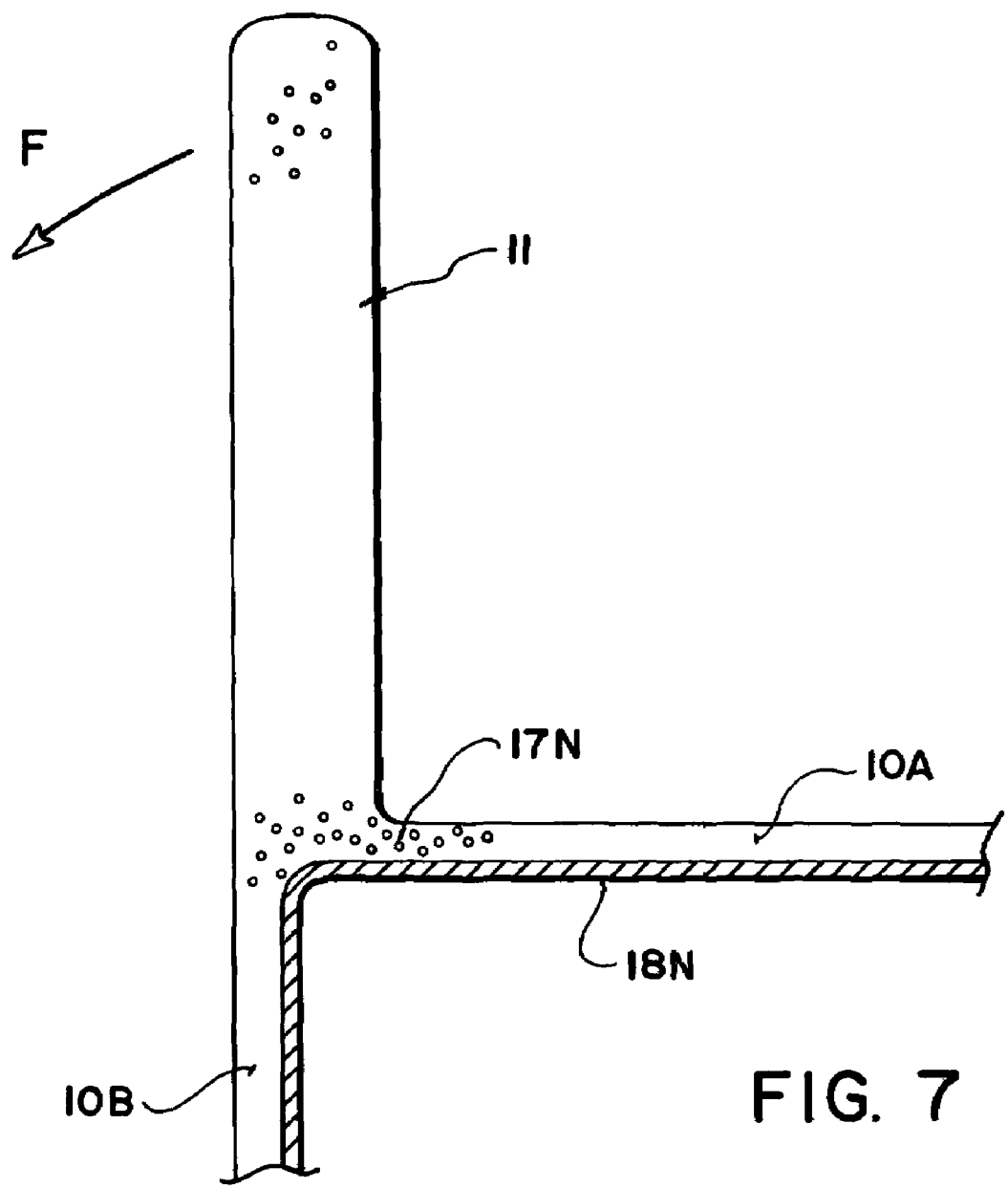
FIG. 7 is a cross sectional view on an enlarged scale of an alternative construction of the fiber reinforcement used in the part shown in FIG. 1.

The conclusions from the above trials are that the urethane resin of RSI in the absence of transverse fibers does not have sufficient strength or toughness in wall widths greater than of the order of 1.0 inches to match the required strengths for the required parts. It is necessary therefore to add the transverse fibers when the wall width is greater than of the order of 1.0 inch in order to provide this necessary strength or toughness. When the height of for example the leg 11 as shown in FIG. 7 has a height no greater than of the order of 1.0 inches, the strength of the resin alone in conjunction with solely the longitudinal fibers is sufficient to provide the required strength or toughness for the leg to prevent cracking of the leg within its width or at the angle joint with the remainder of the part. When the wall width such as the walls 10A and 10B in FIG. 7 have a greater width which can be as much as 2 to 3 inches, it is necessary to provide the transverse fibers to provide the necessary strength against fracturing during bowing of the wall. The thickness of the leg may be increased so that it is at least 10% thicker and may be as much as approximately double the thickness of the walls 10A and 10B.

The increase in thickness of this range will still allow the part to be pultruded through the die without significantly imbalancing the fiber structure as it enters the die and passes through the die. It will be appreciated in this regard that the mandrel necessary to form the hollow interior is floating so that it is necessary to balance the fibrous structure so the mandrel floats in the required position and does not deviate to one side which would significantly reduce the thickness of the wall at that one side. In order therefore to maintain the walls 10A, 10B, 10C and 10D approximately the same thickness, some increase in the thickness of the leg 11 can be accommodated but not greater than the value set forth above.

It is yet further concluded from the above results that somewhat surprisingly an increase in the amount of transverse fibers does not lead to an increase in the transverse strength. It is believed that this occurs due to the fact that the presence of the transverse fibers inhibits the formation of cross linking within the resin so that the presence of the fibers does not make up for the absence of cross linking. Thus the structure can de-laminate under inter-laminar shear at the transverse fibers when bending particularly at a junction for example between the leg 11 and the wall 10A. Thus the arrangement of the present invention preferably uses a minimum quantity of transverse fibers which are necessary to provide for the resin the increase in strength for the walls 10A and 10B to match conventional strengths. This reduces the tendency to de-laminate under inter-laminar shear which could otherwise occur where thicker layers of transverse fibers or mats and used.

In FIG. 7 it will also be noted that the mat layer indicated at 18N is located on the inside surface of each of the walls 10A, 10B, etc. Thus the mat forms the innermost layer and the remainder of the wall is reinforced by the conventional longitudinal fibers indicated at 17N.

Conventionally it is problematic for a pultrusion to pass through the die where the components are not balanced. Thus where the mat is provided only at one surface, this is normally not acceptable since this provides different levels of drag against the different sides of the die which imbalance the structure and tend to generate bowing or distortion in the product. However in this case it is possible to run a hollow structure where the mat is wholly on the inside surface and only in the hollow section, since this allows a suitable balancing of the structure while maintaining the wall thicknesses substantially equal and constant. The use of a single mat reduces material costs. The single mat can be very thin and very light since it is required merely to provide slightly additional transverse strength for the cross linked resin. The absence of a mat in the outside surface of the part can provide an improved quality of appearance in the outside surface.

The absence of the mat at the junction between the leg 11 and the wall 10A reduces the risk of de-lamination in the event that the leg 11 is twisted by forces applying a pivotal action about a pivot axis at the bottom of the leg 11. Thus the absence of any de-lamination at this point allows the resin to provide its natural cross link strength to prevent cracking at that location. Cracking along the wall 10A is prevented by the cross linking of the resin and by the presence of the mat 18N.

Figure 11:
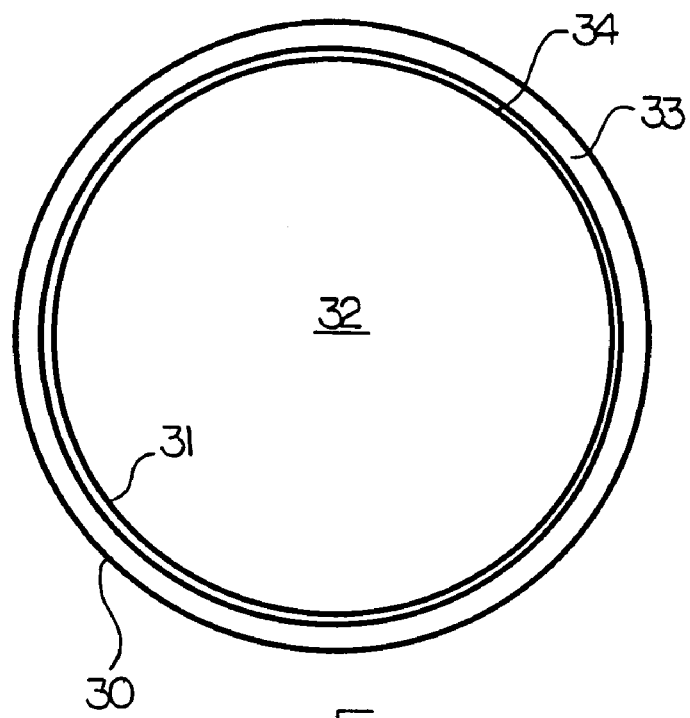
FIGS. 11 and 12 are each a cross sectional view through a simple pultruded part according to the present invention suitable as a tool handle.
Figure 12:
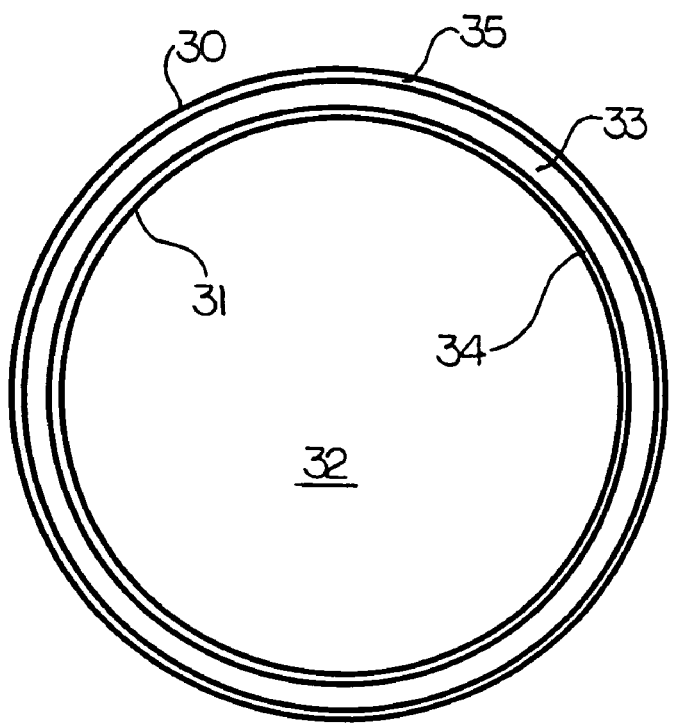

In FIGS. 11 and 12 is shown a simple tubular pultruded product of for example circular cross section defining a cylindrical outer surface 30 and a cylindrical inner surface 31 surrounding a hollow interior 32. The product is pultruded to provide a wall having a wall thickness defined between the inner and outer surfaces which is substantially the same as that previously described. The wall is formed by the resin which impregnates the reinforcing fibres as previously described so the resin in effect defines the inner and outer surfaces with the fibres embedded therein.

In FIG. 11 the main body of the part is formed from a layer of reinforcing fibres 33 which contains only longitudinal continuous fibres formed by rovings in the conventional manner. A second layer 34 at the inner surface 31 is defined by a veil having a thickness as previously described and preferably of the order of 0.1 ounces per square foot. Thus the continuous longitudinal fibres in the layer 33 reach to the outside surface 30 and substantially lie in the outside surface with the resin just covering the fibres so as to retain the fibres within the resin.

The embodiment shown in FIG. 12 is substantially identical with the exception that an additional conventional layer 35 is applied onto the outside surface of the fibres of the layer 33 to form a surface veil covering the fibres and holding them retained within the resin. The veil material on the outside surface is intended simply as a surface veil without significantly contributing to the reinforcing effect. However the veil material on the inside surface, while it is of the same thickness and same structure as the veil on the outside surface, does significantly contribute to the reinforcing fibres and provides a product which has sufficient strength to satisfy the market for conventional pultruded products of this general type. Thus the presence or absence of the surface veil on the outside surface has little effect and the embodiment can include the surface veil or not include the surface veil as required by the characteristics of the part and the end use of the part. However the material on the inside surface provides a significant reinforcing effect and cannot be omitted. Thus a part which includes a surface veil on the outside surface but no such reinforcing veil material on the inside surface is unsuitable and unsatisfactory and does not provide the required strength.

It has been determined by experimentation in a bend test that the product having the veil only on the outside surface has a bend strength which is insufficient and does not compare to conventional products. However the provision of the veil material on the inside surface provides a significant increase of the order of 25% in bend test strength which brings the product up to a suitable strength to provide the characteristics required for the product concerned.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

TABLE 1

| Sample | Description |
|---|---|
| 1 | OCF mat, Polyester resin, regular process |
| 2 | Nico mat, Polyester resin, regular process |
| 3 | No mat - all roving, RSI resin |
| 4 | Fibermesh, RSI resin, Roving-mat-roving matrix |
| 5 | Nico mat, RSI resin, Roving-mat-roving matrix |
| 6 | OCF mat, RSI resin, Roving-mat-roving matrix |
| 7 | Polyester veil, RSI resin, Roving-mat-roving matrix |
| 8 | Omnimat, RSI resin, Roving-mat-roving matrix |
| 9 | Aluminum mesh, RSI resin, Roving-mat-roving matrix |
| 10 | Steel mesh, RSI resin, Roving-mat-roving matrix |

We claim:

1. A pultruded part comprising:
a wall having a first surface and a second surface spaced by a thickness of the wall, the wall extending longitudinally in a pultrusion direction and having a transverse width transverse to the longitudinal pultrusion direction;
reinforcing fibers within the wall;
a resin permeated between the reinforcing fibers and filling the thickness between the first and second surfaces so as to define the first and second surfaces;
the reinforcing fibers consisting solely of first reinforcing fibers and second reinforcing fibers so that the whole of the thickness between the surfaces is reinforced solely by the first and second reinforcing fibers;
the first reinforcing fibers being defined by solely by fibers extending only in the longitudinal pultrusion direction;
the second reinforcing fibers being formed by a single pre-formed mat of fibers where at least some of the fibers of the mat include at least portions thereof which extend in the transverse direction;
the single pre-formed mat of the second reinforcing fibers being arranged such that all of the fibers in the wall other than the single pre-formed mat of second reinforcing fibers are first fibers extending only in the longitudinal pultrusion direction;
the single pre-formed mat of the second reinforcing fibers having a total weight less than 0.5 ounces per square foot.

2. The pultruded part according to claim 1 wherein the single layer of the second reinforcing fibers is a scrim or mesh.

3. The pultruded part according to claim 1 wherein the single layer of the second reinforcing fibers has a weight which is of the order of or less than 0.25 ounces per square foot.

4. The pultruded part according to claim 1 wherein the single layer of the second reinforcing fibers is formed substantially wholly of glass fibers.

5. The pultruded part according to claim 1 wherein the single layer of the second reinforcing fibers is formed substantially wholly of polyester fibers.

6. A pultruded part comprising:
a wall having a first surface and a second surface spaced by a thickness of the wall, the wall extending longitudinally in a pultrusion direction and having a transverse width transverse to the longitudinal pultrusion direction;
the wall defining a peripheral wall fully surrounding a hollow interior such that the first surface faces outwardly and the second surface faces inwardly;
reinforcing fibers within the wall;
a resin permeated between the reinforcing fibers and filling the thickness between the first and second surfaces so as to define the first and second surfaces;
the reinforcing fibers consisting solely of first reinforcing fibers and second reinforcing fibers so that the whole of the thickness between the surfaces is reinforced solely by the first and second reinforcing fibers;
the first reinforcing fibers being defined by solely by fibers extending only in the longitudinal pultrusion direction;
the second reinforcing fibers being formed by a single pre-formed mat of fibers where at least some of the fibers of the mat include at least portions thereof which extend in the transverse direction;
the single pre-formed mat of the second reinforcing fibers being located at the second surface such that all of the fibers in the wall from the single pre-formed mat of second reinforcing fibers at the second surface to the first surface are first fibers extending only in the longitudinal pultrusion direction;
the single pre-formed mat of the second reinforcing fibers having a total weight less than 0.5 ounces per square foot.

7. The pultruded part according to claim 6 wherein the single layer of the second reinforcing fibers is a scrim or mesh.

8. The pultruded part according to claim 6 wherein the single layer of the second reinforcing fibers has a weight which is of the order of or less than 0.25 ounces per square foot.

9. The pultruded part according to claim 6 wherein the single layer of the second reinforcing fibers is formed substantially wholly of glass fibers.

10. The pultruded part according to claim 6 wherein the single layer of the second reinforcing fibers is formed substantially wholly of polyester fibers.

11. A pultruded part comprising:

a wall having a first surface and a second surface spaced by a thickness of the wall, the wall extending longitudinally in a pultrusion direction and having a transverse width transverse to the longitudinal pultrusion direction;

reinforcing fibers within the wall;

a resin permeated between the reinforcing fibers and filling the thickness between the first and second surfaces so as to define the first and second surfaces;

the reinforcing fibers consisting solely of first reinforcing fibers and second reinforcing fibers so that the whole of the thickness between the surfaces is reinforced solely by the first and second reinforcing fibers;

the first reinforcing fibers being defined by solely by fibers extending only in the longitudinal pultrusion direction;

the second reinforcing fibers being formed by a single pre-formed mat of fibers where at least some of the fibers of the mat include at least portions thereof which extend in the transverse direction;

the single pre-formed mat of the second reinforcing fibers being located at a position spaced from the first and second surfaces such that all of the fibers in the wall from the single pre-formed mat of second reinforcing fibers to the first surface and from the single pre-formed mat of second reinforcing fibers to the second surface are first fibers extending only in the longitudinal pultrusion direction;

the single pre-formed mat of the second reinforcing fibers having a total weight less than 0.5 ounces per square foot.

12. The pultruded part according to claim 11 wherein the single layer of the second reinforcing fibers is a scrim or mesh.

13. The pultruded pad according to claim 11 wherein the single layer of the second reinforcing fibers has a weight which is of the order of or less than 0.25 ounces per square foot.

14. The pultruded part according to claim 11 wherein the single layer of the second reinforcing fibers is formed substantially wholly of glass fibers.

15. The pultruded pad according to claim 11 wherein the single layer of the second reinforcing fibers is formed substantially wholly of polyester fibers.

* * * * *